(12) United States Patent
Ikeya et al.

(10) Patent No.: US 8,513,511 B2
(45) Date of Patent: Aug. 20, 2013

(54) APPARATUS FOR PRACTICING PLAYING MUSIC

(75) Inventors: Tadahiko Ikeya, Hamamatsu (JP);
Toshiya Ikegami, Hamamatsu (JP);
Takeshi Fuse, Higashikurume (JP);
Misa Noguchi, Hamamatsu (JP);
Kayoko Sugiyama, Hamamatsu (JP);
Yuka Yokota, Kawasaki (JP); Suemi Mizuma, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 40 days.

(21) Appl. No.: 12/686,961

(22) Filed: Jan. 13, 2010

(65) Prior Publication Data

US 2010/0175537 A1 Jul. 15, 2010

(30) Foreign Application Priority Data

Jan. 13, 2009 (JP) ................................. 2009-004321

(51) Int. Cl.
*G09B 15/08* (2006.01)

(52) U.S. Cl.
USPC ............................................. 84/478; 84/609

(58) Field of Classification Search
USPC .......................................................... 84/478
See application file for complete search history.

(56) References Cited

U.S. PATENT DOCUMENTS

| 5,371,316 A * | 12/1994 | Eitaki et al. ..................... 84/634 |
| 6,287,124 B1 * | 9/2001 | Yamaura et al. .............. 434/219 |
| 6,426,455 B2 * | 7/2002 | Hasegawa ................... 84/470 R |
| 2006/0014128 A1 | 1/2006 | Mizuno |

FOREIGN PATENT DOCUMENTS

| JP | 11167341 | 6/1999 |
| JP | 2002-108198 A | 4/2002 |
| JP | 2003-058153 | 2/2003 |
| JP | 2003-150154 A | 5/2003 |
| JP | 2006-023507 A | 1/2006 |

OTHER PUBLICATIONS

Casio Computer Co., Ltd., LK-270 User's Guide [no date shown on document].
Notice of Reasons for Rejection mailed Feb. 28, 2012, for JP Patent Application No. 2009-004321, with English Translation, three pages.

* cited by examiner

*Primary Examiner* — Christopher Uhlir
(74) *Attorney, Agent, or Firm* — Morrison & Foerster LLP

(57) ABSTRACT

An apparatus for practicing playing music on a musical instrument provides a stepped lesson comprised of a series of lesson steps about a subject music piece, each step providing practicing materials for a user to master for playing the subject music piece. The lesson steps are given to the user step by step. The apparatus stores a music-playing data set of a subject music piece for a reference and a music-playing data sets of the stepped lesson, and comprises a music-playing input device for the user to input music-playing manipulations. The apparatus judges, at each of the lesson steps, the achievements of the user in comparison with the reference music-playing data. The apparatus keeps a pass/fail score table for recording pass/fail judgments about the achievements of the user with respect to the respective lesson steps. The user can practice lesson steps selectively with reference to the pass/fail score table about his/her achievements.

6 Claims, 8 Drawing Sheets

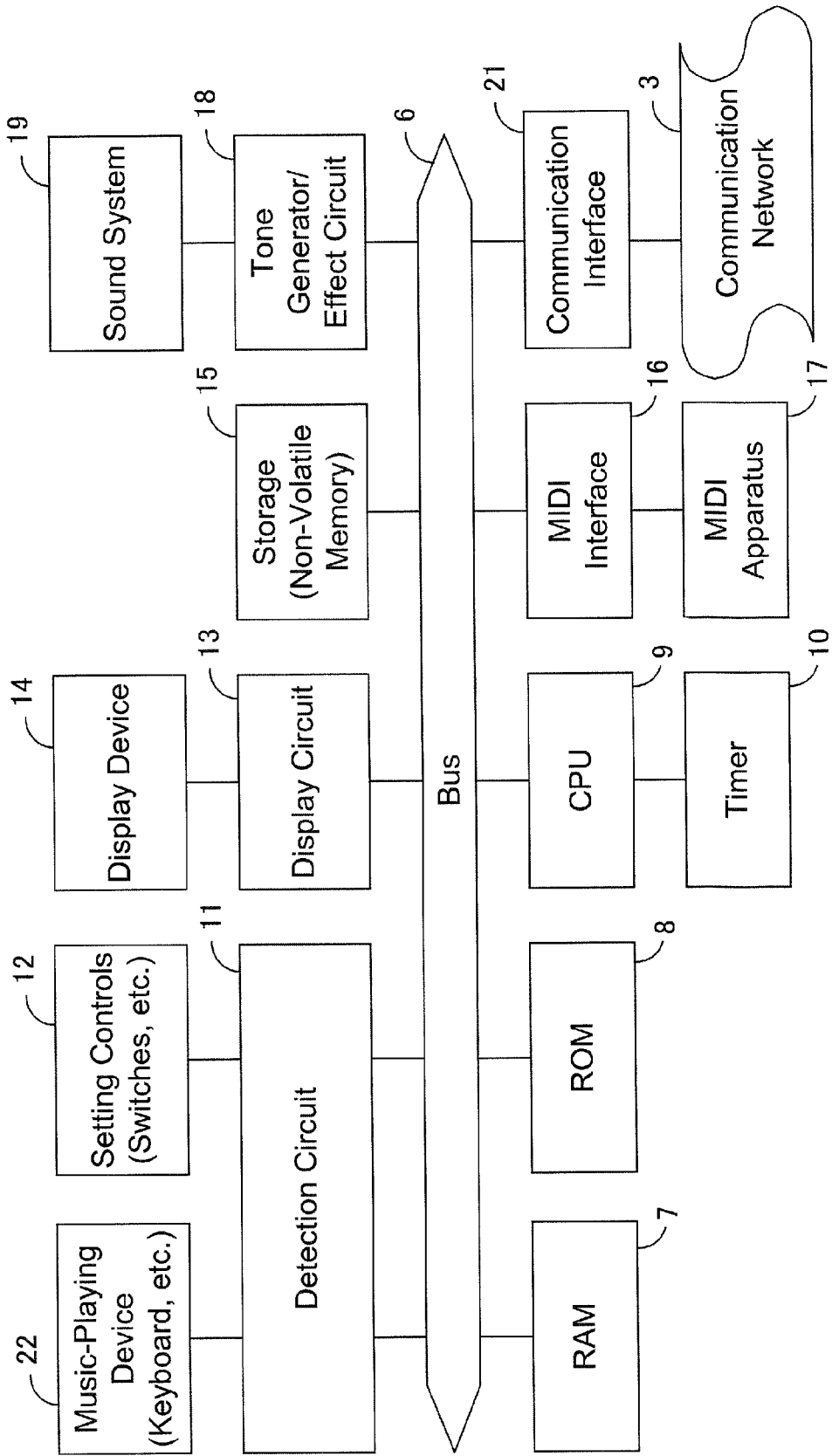

Fig. 2  Song Data File Structure
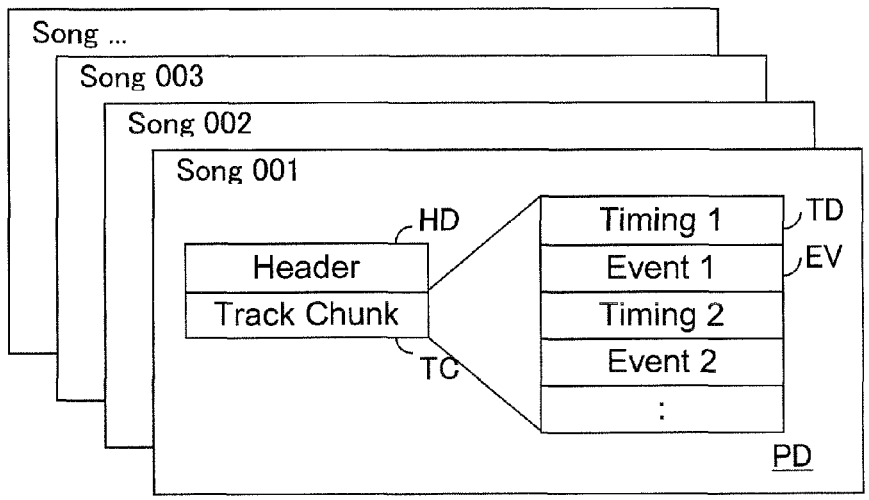
Fig. 3  Step Info File Structure
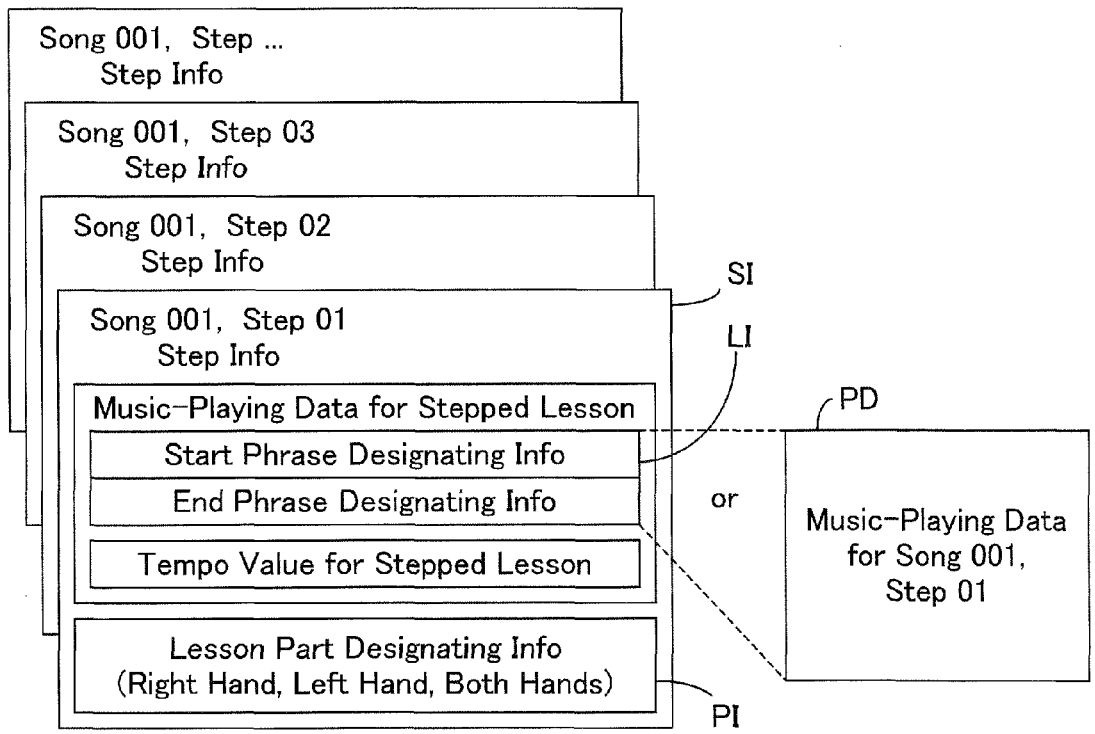

Fig. 4 Pass/Fail Score Table
| | Step 01 | Step 02 | Step 03 | Step 04 | Step 05 | Step 06 | Step 07 | Step 08 | Step 09 |
|---|---|---|---|---|---|---|---|---|---|
| Song 01 | Passed | Failed | Passed | Failed | Passed | Failed | Failed | Failed | Failed |
| Song 02 | Passed | Passed | Passed | Passed | Passed | Passed | Passed | Failed | --- |
| Song 03 | Failed | Passed | Failed | Passed | Passed | --- | --- | --- | --- |
| .. | .. | .. | .. | .. | .. | .. | .. | .. | .. |
PT
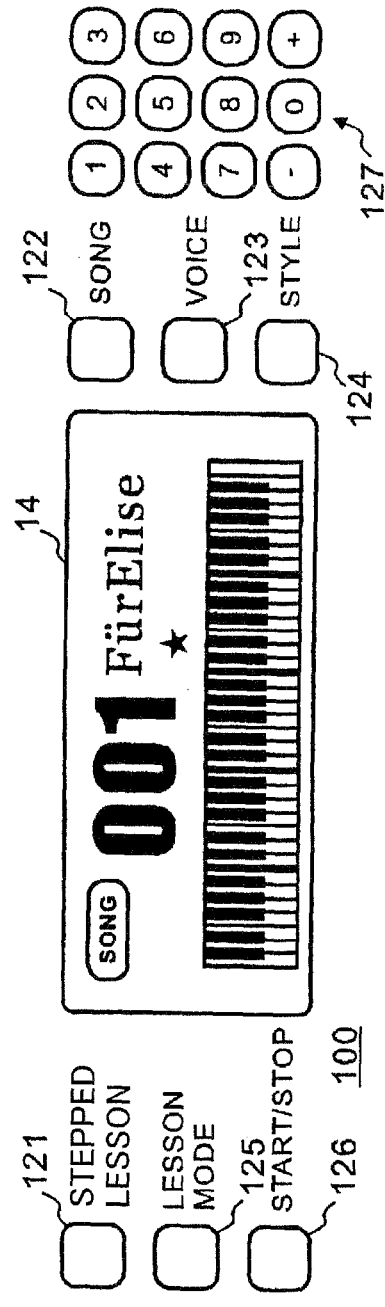
Fig. 5 Pannel Layout of Practicing Apparatus

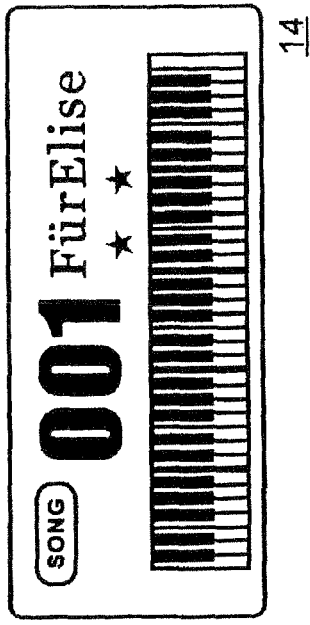
Fig. 6b Display Screen
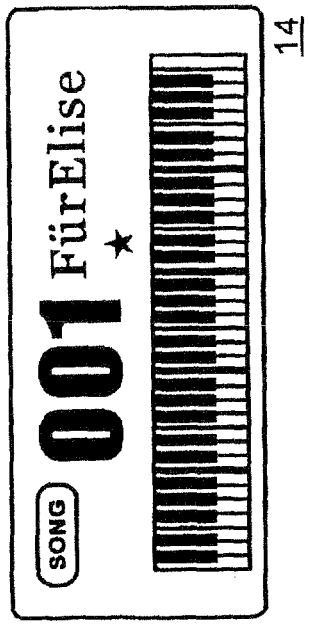
Fig. 6d Display Screen
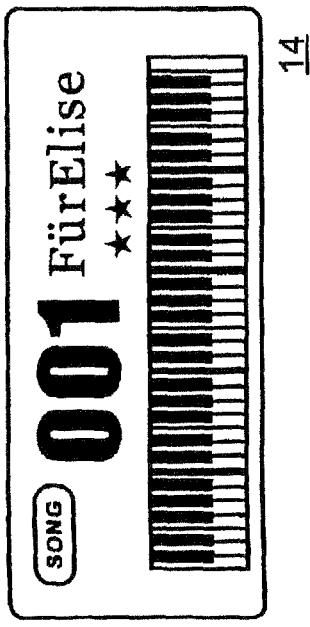
Fig. 6a Display Screen
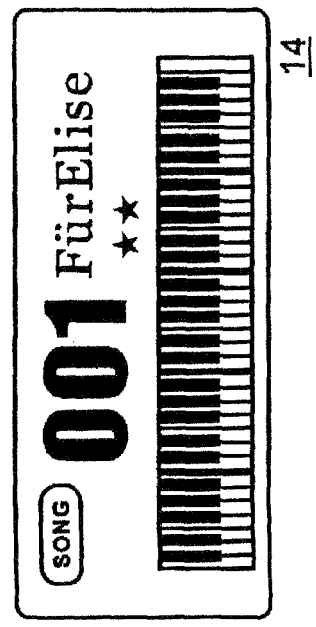
Fig. 6c Display Screen

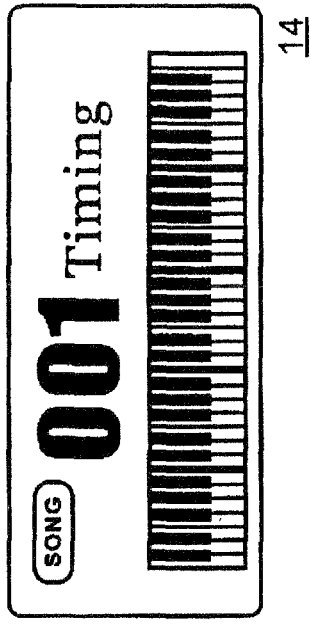
Fig. 6f  Display Screen
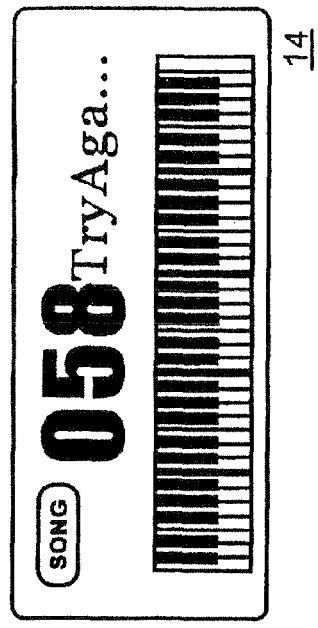
Fig. 6h  Display Screen
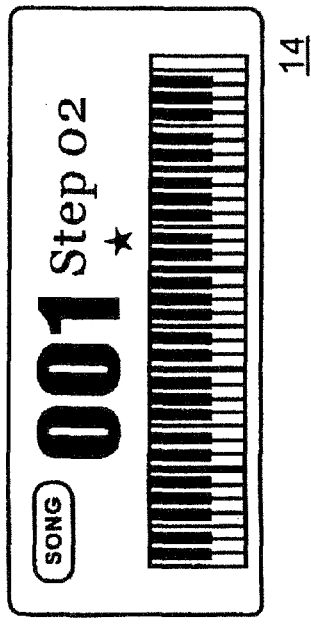
Fig. 6e  Display Screen
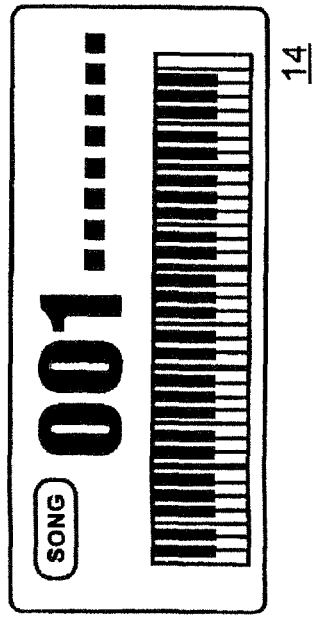
Fig. 6g  Display Screen

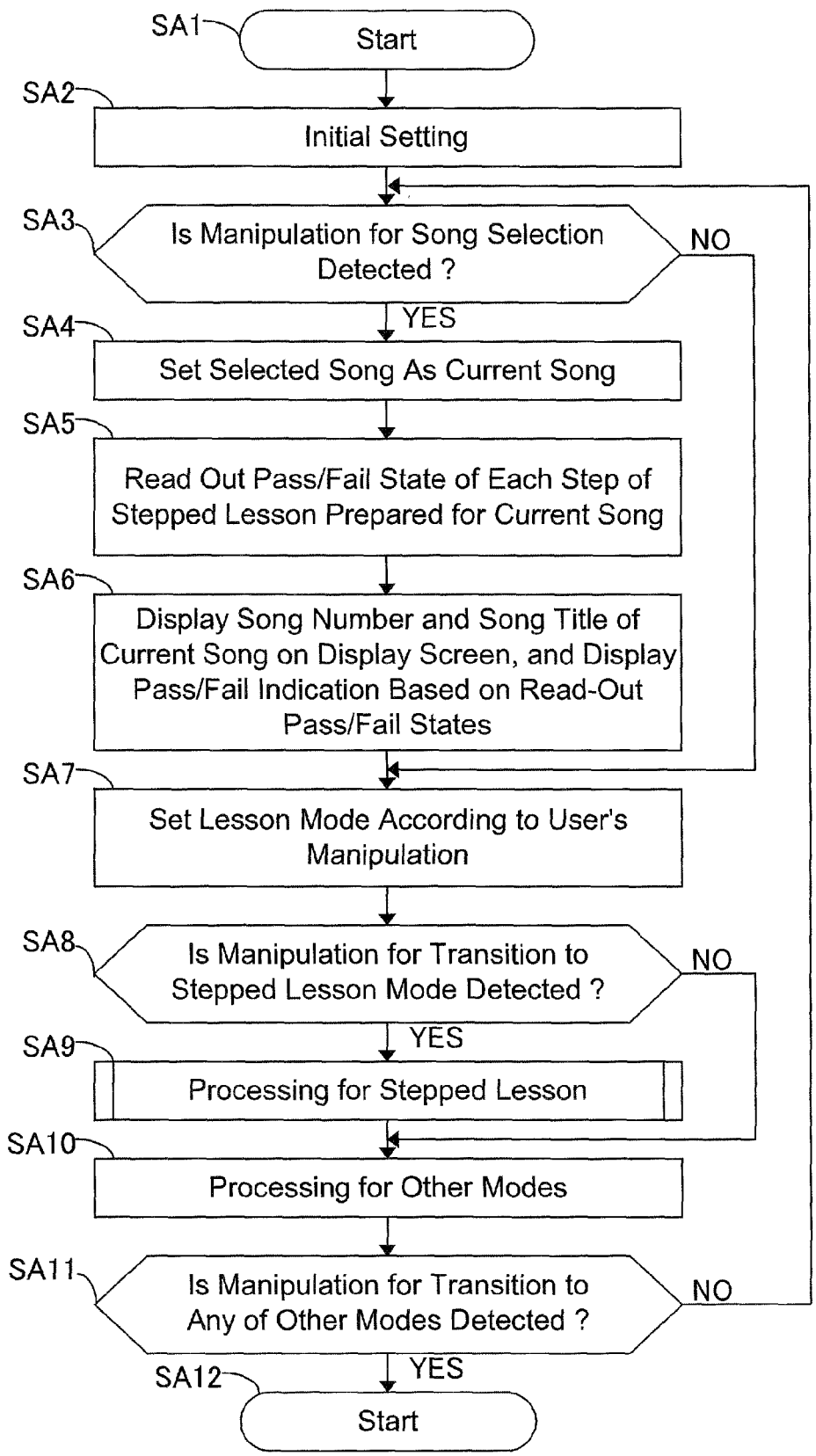
Fig. 7  Processing in Song Mode

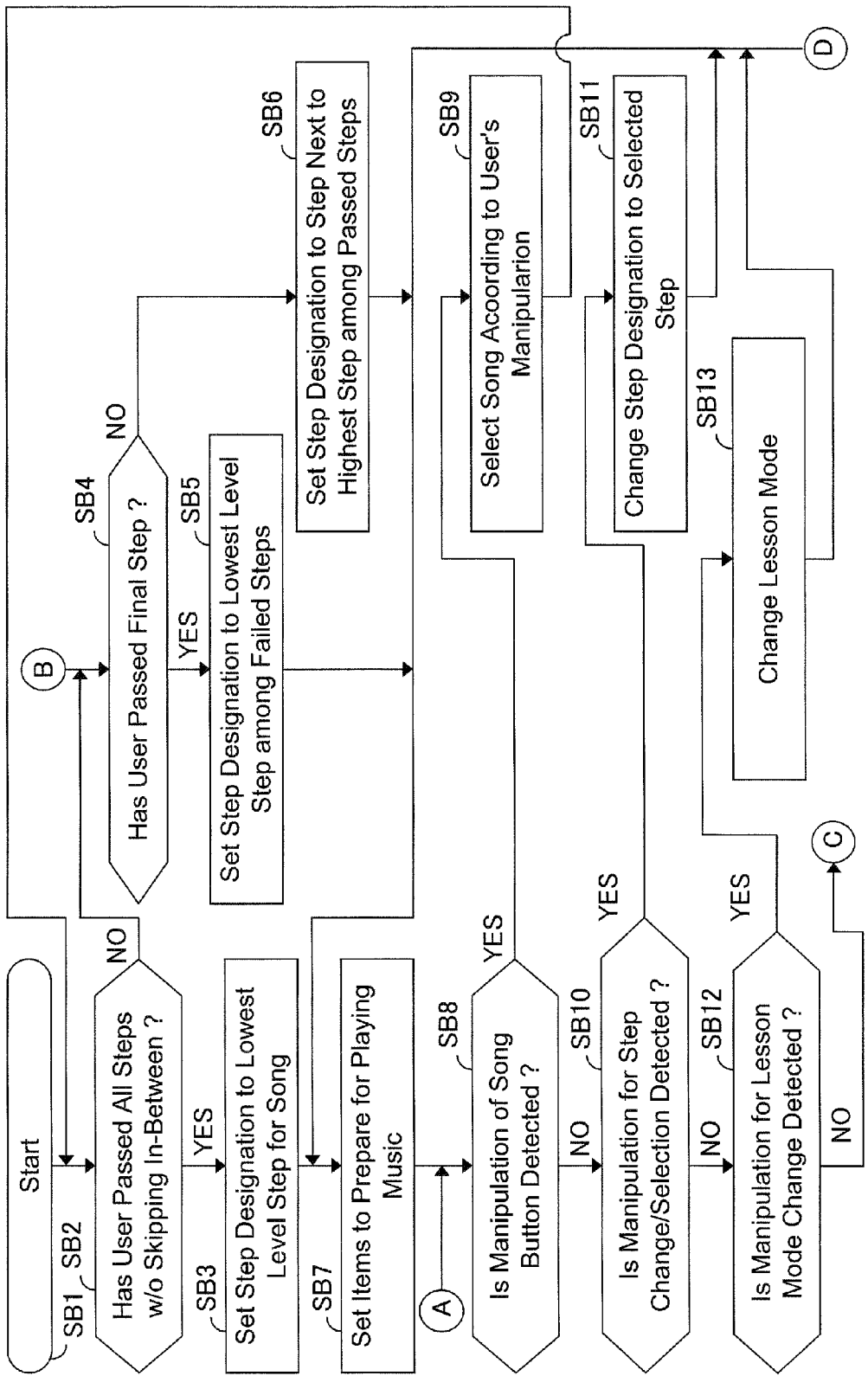
Fig. 8a Processing for Stepped Lesson (Part 1)

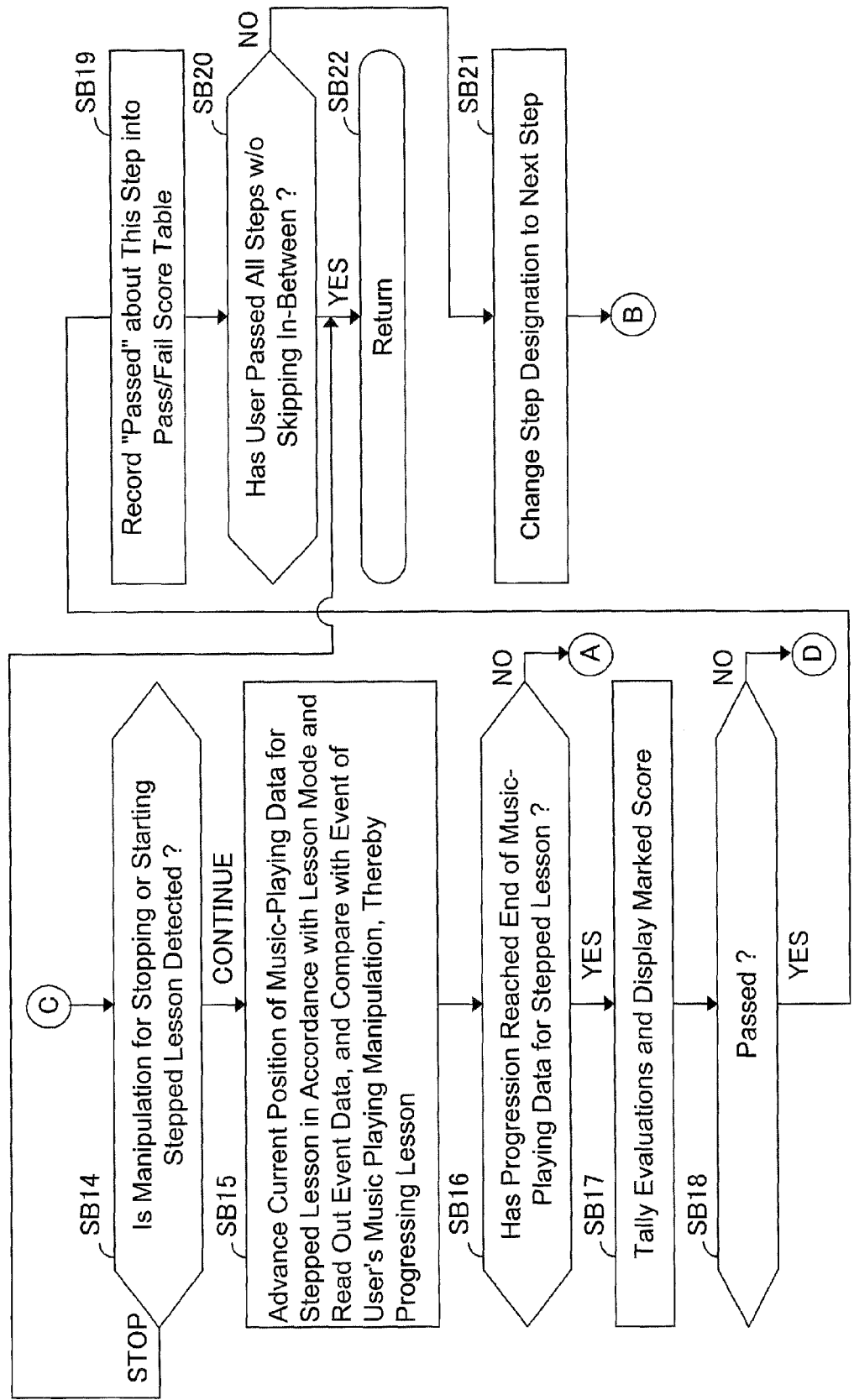

APPARATUS FOR PRACTICING PLAYING MUSIC

TECHNICAL FIELD

The present invention relates to an apparatus for practicing playing music, and more particularly to an apparatus for practicing playing a subject music piece on a musical instrument, wherein the practicing apparatus conducts a stepped lesson comprised of a series of lesson steps about the subject music piece by giving the lesson steps to a user step by step, each step providing practicing materials of a practicing music piece for a user to master for playing the subject music piece on the musical instrument, and by judging pass/fail states about the respective lesson steps. The lesson steps can be flexibly given to the user according to the user's convenience, for example, by skipping some steps in-between among the series of lesson steps, or by repeating practice from a particular step, depending on the progress of the practicing, i.e. the pass/fail achievements of the respective lesson steps.

BACKGROUND INFORMATION

There are several musical training apparatuses conventionally known in the art for a trainee (user) to practice playing music, which apparatuses store music-playing data of subject music pieces and music-playing data of a plurality of practicing music pieces (etudes) prepared for each subject music piece. Such an example is disclosed in unexamined Japanese patent publication No. H11-167341. In such a training apparatus, a subject music piece and the practicing music pieces are linked by lesson conducting information.

When the user selects a subject music piece, the practicing music pieces prepared for the selected subject music piece will be given to the user, and the user can practice playing those practicing music pieces according to a given schedule. The training apparatus is equipped with a playing guide function which, for example, indicates the keys to be depressed along the progression of the music piece. The practicing music pieces for one subject music piece are generally provided in different degrees or steps of difficulty, and will be given to the user, starting with a lower level practicing music piece and successively grading up toward a higher level practicing music piece.

In a conventional musical training apparatus, however, when a user practices playing a subject music piece having a plurality of practicing steps, the training apparatus does not store the extent of the last practicing, i.e. to what step the user has finished at the last practicing. Thus, it is difficult to resume the stepped lesson from the lesson step which is next to the last finished lesson step at the preceding practicing, if the user has used, on the midway of the stepped lesson, another mode operation of the training apparatus such as a regular music playback mode or has switched off the power of the training apparatus. Further, it is difficult to resume the practicing after the apparatus has been shut down and the user has taken a break.

Further, if the user wants to practice with a plurality of subject music pieces in parallel, i.e. alternately, it is hard to resume the respective stepped lessons (for the respective subject music pieces) starting from the next consecutive steps, respectively, as the apparatus does not store the progress states of the stepped lesson with respect to each of the subject music pieces.

Still further, when the user selects a subject music piece to practice, it is not possible to recognize the pass/fail states of all the lesson steps of the subject music piece which the user is going to select.

SUMMARY OF THE INVENTION

In view of the foregoing circumstances, therefore, it is a primary object of the present invention to provide an apparatus for practicing playing music with which a user can smoothly and conveniently train himself/herself with practicing music pieces provided in a plurality of lesson steps for a subject music piece.

According to the present invention, the object is accomplished by providing an apparatus for practicing playing music comprising: a storage device which stores a music-playing data set of a subject music piece to practice playing, a music-playing data set of a stepped lesson comprised of a series of lesson steps about the subject music piece, each step providing practicing materials for a user to master for playing the subject music piece, and a pass/fail data table for recording pass/fail judgments about achievements of the user with the practicing materials of the respective lesson steps; a stepped lesson conducting device which conducts the stepped lesson by giving the lesson steps about the subject music piece to the user step by step based on the data set of the stepped lesson; a step designating device for designating a lesson step to be given by the stepped lesson conducting device; a music-playing input device for inputting music-playing manipulations by the user; a judging device which evaluates for each of the lesson steps, based on the data set of the stepped lesson, the inputted music-playing manipulations to judge whether the user has passed or failed in each of the lesson steps in terms of the practicing materials; a recording device which records for each of the lesson steps a result of the judgment by the judging device into the pass/fail data table; and a display device which displays an identification of the subject music piece and the pass/fail judgments of the user about the lesson steps in the stepped lesson for the subject music piece.

In an aspect of the present invention, the storage device may store data sets of a plurality of subject music pieces, and data sets of a plurality of stepped lessons each for practicing playing one of the subject music pieces, and the apparatus may further comprise a selecting device for selecting a data set of a subject music piece from among the plurality of subject music pieces.

In another aspect of the present invention, the stepped lesson conducting device may give the lesson steps to the user with an in-between lesson step skipped in the series of lesson steps, and the judging device may judge whether the user has passed the given lesson steps, including the last lesson step, which have not been skipped.

In a further aspect of the present invention, the display device may indicate which of the lesson steps has been given and which of the lesson steps has not.

In a still further aspect of the present invention, the stepped lesson conducting device may give the lesson steps to the user starting at the skipped lesson step when the user takes the stepped lesson again in which the user has passed the last lesson step, and may give the lesson steps from the beginning when the user has passed all of the lesson steps.

In a still further aspect of the present invention, the step designating device may designate a lesson step of the lowest level among the lesson steps which the user has not passed yet, when there are skipped lesson steps remaining.

In a still further aspect of the present invention, the stepped lesson conducting device may give the lesson steps to the user starting at a lesson step which is next to the lesson step of the highest level among the lesson steps which the user has passed, when the user takes the stepped lesson the last lesson step of which the user has not passed.

In a still further aspect of the present invention, the stepped lesson conducting device may give the lesson steps to the user starting at a lesson step which is of the lowest level among the lesson steps which the user has not passed yet, when the user has not passed all of the lesson steps.

In a still further aspect of the present invention, the step designating device may detect a step in which the user has failed among the series of lesson steps with reference to the pass/fail table to automatically designate the detected lesson step as a step to be conducted by the stepped lesson conducting device.

According to the present invention, the object is further accomplished by providing a computer readable medium storing a computer program containing instructions executable by a computer for: reading out, from a storage device, a music-playing data set of a subject music piece, a music-playing data set of a stepped lesson comprised of a series of lesson steps about the subject music piece, each step providing practicing materials for a user to master for playing the subject music piece, and a pass/fail data table for recording pass/fail judgments about achievements of the user with the practicing materials of the respective lesson steps; conducting the stepped lesson by giving the lesson steps about the subject music piece to the user step by step based on the data set of the stepped lesson; designating a lesson step to be given by the stepped lesson conducting device; inputting music-playing manipulations by the user; evaluating for each of the lesson steps, based on the data set of the stepped lesson, the inputted music-playing manipulations to judge whether the user has passed or failed in each of the lesson steps in terms of the practicing materials; recording for each of the lesson steps a result of the judgment into the pass/fail data table; and displaying an identification of the subject music piece and the pass/fail judgments of the user about the lesson steps in the stepped lesson for the subject music piece.

With an apparatus for practicing playing music according to the present invention, a user can smoothly and conveniently train himself/herself with practicing music pieces provided in a plurality of lesson steps for a subject music piece.

The invention and its various embodiments can now be better understood by turning to the following detailed description of the preferred embodiments which are presented as illustrated examples of the invention defined in the claims. It is expressly understood that the invention as is defined by the claims may be broader than the illustrated embodiments described bellow.

BRIEF DESCRIPTION OF THE DRAWINGS

For a better understanding of the present invention, and to show how the same may be practiced and will work, reference will now be made, by way of example, to the accompanying drawings, in which:

FIG. 1 is a block diagram showing the hardware configuration of an apparatus for practicing playing music according to an embodiment of the present invention;

FIG. 2 is a visualized chart depicting the data structure of automatic music-playing data sets, i.e. song sets PD (each of a subject music piece or a practicing music piece) according to an embodiment of the present invention;

FIG. 3 is a visualized chart depicting the data structure of step information sets SI according to an embodiment of the present invention;

FIG. 4 is a visualized chart depicting the data table of pass/fail scores of the lesson steps about the respective songs (music pieces) according to an embodiment of the present invention;

FIG. 5 is a plan view showing an example of the layout of the panel 100 of a music-playing practicing apparatus 1 according to an embodiment of the present invention;

FIGS. 6a-6h are plan views each showing the content of the display screen 14 in the panel 100 of FIG. 5;

FIG. 7 is a flow chart showing the processing of the song mode in a practicing apparatus according to an embodiment of the present invention; and FIGS. 8a and 8b are, in combination, a subroutine flow chart showing the processing for the stepped lesson as conducted in the step SA9 in the song mode processing of FIG. 7.

DETAILED DESCRIPTION OF EMBODIMENTS OF THE INVENTION

The present invention will now be described in detail with reference to the drawings showing a preferred embodiment thereof. It should, however, be understood that the illustrated embodiments are merely examples for the purpose of understanding the invention, and should not be taken as limiting the scope of the invention.

FIG. 1 shows a block diagram illustrating the overall hardware configuration of an apparatus 1 for practicing playing music according to an embodiment of the present invention. A practicing apparatus 1 may be configured in the form of an electronic musical instrument including a music-playing device such as a keyboard, and may also be configured with a tone generating device, a computer and so forth to which a music-playing device is connectable. In the embodiment mentioned below, a description will be made mainly with respect to a practicing apparatus 1 which is a keyboard-type electronic musical instrument having a keyboard for playing music.

To a system bus 6 are connected a random access memory (RAM) 7, a read-only memory (ROM) 8, a central processing unit (CPU) 9, a detection circuit 11, a display circuit 13, a storage device 15, a MIDI interface 16, a tone generator and effect circuit 18 and a communication interface 21.

The RAM 7 contains buffer areas such as a playback buffer, and working areas for the CPU 9 for storing flags, registers, various parameters, etc.

The ROM 8 are to store various data sets (or files), various parameters and control programs, associated programs for implementing this embodiment, and so forth. In this case, the programs may not be stored in the storage device 15 in addition.

The CPU 9 conducts various computations and controls in the practicing apparatus 1 according to the control programs and other programs for implementing the present embodiment stored in the ROM 8 or in the storage device 15. A timer 10 is connected to the CPU 9 to supply the basic clock signals, interrupt processing timing signals, and so forth to the CPU 9.

The user can input, set and select various items and matters using setting controls 12 which are connected to the detection circuit 11. The setting controls 12 are disposed on the control panel of the apparatus, and may be of any type such as a switch, a pad, a fader, a slider, a rotary encoder, a joy stick, a jog shuttle, a character inputting keyboard, a mouse, and any other device which can output a signal representing the user's inputting manipulation. The setting controls 12 may further be of a soft switch exhibited on the display screen 14, which soft switch is moved (or manipulated on the screen) using another controlling device such as cursor switches.

In the illustrated embodiment, the setting controls 12 include at least mode designating controls (e.g. a stepped lesson mode switch 121, a song mode switch 122, a voice mode switch 123, a style mode switch 124, etc. of FIG. 5), stepped lesson setting controls (e.g. a stepped lesson mode selecting switch 125 and a stepped lesson start/stop switch 126 of FIG. 5) and value setting controls (e.g. ten-key switches 127 of FIG. 5).

A music-playing device 22 is connected to the detection circuit 11 to input music-playing information signals according to the user's music-playing manipulations on the apparatus 1. The music-playing device 22 may be a musical keyboard or a playing pad device. The music-playing device 22, however, may be of any other type, as long as it serves to input user's music playing information. The music-playing device 22 (i.e. a keyboard or pads) is a device comprising manipulating members, each being assigned to each of the notes to be played, for inputting the user's music-playing operation to input the manipulation start time and the manipulation end time as a key-on signal and a key-off signal, respectively, of the note assigned to the manipulated member.

A display device 14 is connected to the display circuit 13 to display various information on the screen of the display device 14. The display device 14 is arranged on a front panel 100 (FIG. 5) of the music-playing practicing apparatus, and can display selection information for setting the music-playing practicing apparatus 1, music piece information such as a music score and words, guiding information (e.g. fingering information and play-timing information) for playing music to practice with the lesson piece of music, pass/fail information of the respective lesson steps, scores of the respective lesson steps, and so forth.

The storage device 15 comprised of at least one of the combinations of storage media and their drives such as a hard disk and a hard disk drive, an FD (flexible disk or Floppy Disk™) and an FD drive, a CD (compact disc) and a CD drive, a DVD (digital versatile disc) and a DVD drive, a semiconductor memory such as a flash memory and a memory reader. The storage medium may be detachable or may be built in the music-playing practicing apparatus 1. The storage device 15 and/or ROM 8 can store automatic music-playing data sets or files (song data sets or files of FIG. 2), programs for realizing the various embodiments of the present invention, and other programs for controlling the music-playing practicing apparatus 1. A data set or data file is a block or group of associated data for its intended use, and may not necessarily be in a particular (limited) file format or protocol. When the programs for realizing the various embodiments of the present invention and the other programs for controlling the music-playing practicing apparatus 1 are stored in the storage device 15, the same programs need not be stored in the ROM 8 additionally. Or some of the programs may be stored in the storage device 15, while some other programs may be stored in the ROM 8.

In the present embodiment, a rewritable non-volatile memory is employed as the external storage device, in which a pass/fail score table PT is provided beforehand. In this embodiment, the external storage 15 or the ROM 8 stores beforehand a plurality of music-playing data sets of subject music pieces (music-playing data sets PDs of subject music pieces of FIG. 2) and step information files or data sets SI including a plurality of music-playing data sets for stepped lessons (music-playing data sets PD of practicing music pieces or music piece portion designation information files or data sets LI of FIG. 3). The music-playing data sets PD, the step information SI and the pass/fail score table PT will be described in detail herein later.

The tone generator/effect circuit 18 generates musical tone signals according to automatic music-playing data stored in the storage device 15, ROM 8, RAM 7 or the like, or music-playing signals supplied from the music-playing device 22 or an external apparatus connected to the communication interface 21, or MIDI signals supplied from the MIDI apparatus 17 connected to the MIDI interface 16, and imparts various musical sound effects to the generated musical tone signals, before supplying to a sound system 19. The sound system 19 includes a D/A converter to convert the supplied digital musical tone signals and a loudspeaker to emit as audible sounds.

The communication interface 21 can be at least one of available communication interfaces including a general-purpose short distance wired interface such as a USB and an IEEE1394 device, a general-purpose network interface such as Ethernet™, and a general-purpose short distance wireless interface such as a wireless LAN and Bluetooth™, etc.

FIG. 2 is a visualized chart depicting the data structure of automatic music-playing data sets, i.e. song files PD (each of a subject music piece or a practicing music piece) according to an embodiment of the present invention.

An automatic music-playing data set is a data set of the MIDI format or else for playing a music piece, and contains a header HD and track chunks TC recording timing data pieces TD and various events EV to be played back at the times indicated by the timing data TD. The track chunks records musical events for a plurality of MIDI channels, for example, the events of the right hand manipulations in channel CH1 and the events of the left hand manipulations in channel CH2. Further, events of other music-playing parts may also be recorded in other MIDI channels.

The automatic music-playing data sets, i.e. song data files PD are stored, for example, in the external storage 15 or the ROM 8. The automatic music-playing data sets PD may not necessarily be stored within the music-playing practicing apparatus 1 itself, but may be acquired via a communication network 3. For example, the automatic music-playing data sets can be downloaded from a music-playing data delivery service site in a network such as the Internet by pseudo-streaming (a downloading method in which data sets such as MIDI data sets are batch-downloaded to be played back and automatically deleted after the playback has been completed). The automatic music-playing data set PD stored in the external storage 15 in FIG. 1 is recorded in a playback buffer in the RAM 7 to be played back. The automatic music-playing data set PD temporarily downloaded by pseudo-streaming is stored in the playback buffer in the RAM 7 and is deleted after the playback has been finished.

The header HD is a data area for the description about the automatic music-playing data set PD, and, for example, in the case where the automatic music-playing data set PD is a standard MIDI file (SMF), the header HD includes the description of the format (0/1/2) and the division (the note quantization unit). The music-playing data set may be of other than the standard MIDI file, and the header HD may include other information. The header HD is generally placed at the head position (i.e. header chunk) of the automatic music-playing data set PD, and the substantive music-playing data are described in the track chunk TC following the header HD. The substantive music-playing data are, for example, an alignment of data pairs, each of a timing data piece TD and an event data piece EV, along the time axis.

The timing data piece TD is a data piece representing a time position in the progression of music and is expressed in ticks (clocks), where the unit tick (clock) is a value obtained by dividing a predetermined note duration (i.e. time length) by a predetermined number (division number), for example by dividing the duration of a quarter note by "1920." As the value of "1 tick" is a time length obtained by dividing a quarter note duration by the division number, the absolute time length of "1 tick" depends on the tempo of the music. The timing data piece TD may be expressed in terms of absolute times (tick counts) from a particular starting point such as the head position of the music piece (music-playing data set PD), or may be expressed in terms of relative times (tick counts) from each preceding event (preceding timing data piece TD). In the present embodiment, however, the timing data piece TD represents the time position of the event by an absolute time length as counted from the head position of the music-playing data set PD.

The event data piece EV is a data piece to be played back (through the tone generator/effect circuit 18 and the sound system 19) or read out at the time point indicated by the timing data piece TD, and represents an event such as a note event, a program change event to change the tone color, a control change event to change the tone volume or the effect (e.g. all-note off, all-sound off, etc.) and a system exclusive event. The note event may define a note-on time and a note-off time separately, or may define a combination of a note-on time and a gate time (tone generating time length). In the present embodiment, a note event is recorded by a note-on time and a gate time in combination. Further, an end event is recorded at the end of the automatic music-playing data set PD.

An event to designate a chord, an event which corresponds to a phrase mark, an event to designate a tempo, and so forth are recorded as metaevents in the form of the system exclusive having no designation of a MIDI channel.

FIG. 3 is a visualized chart depicting the data structure of step information files or data set SI according to an embodiment of the present invention. The step information files SI are provided separately for each of a plurality of lesson steps for each of the music-playing data sets PD of the subject music pieces. For example, for the music-playing data set PD of a subject music piece having a set name of "Song 001," there are provided step information files or data sets SI of "Step 01" through "Step 09." In this specification, steps having smaller step numbers are lower level steps and steps having larger numbers are higher level steps. Accordingly, where there are provided step information files or data sets SI for a stepped lesson consisting of nine steps from "Step 01" through "Step 09," the "Step 01" is the lowest level step and the "Step 09" is the highest level step. Relative to the "Step 02," the "Step 01" is a lower step and the "Step 03" is a higher step. Further, it should be understood that a lower step is a lower grade step in difficulty and a higher step is a higher grade step in difficulty. It should also be understood here that the term "the next step" means a step which is higher in difficulty by one grade than the currently designated step.

Needless to say, the number of lesson steps are not limited to that described above, and further may be different for music-playing data sets PD of different subject music pieces. Further, in the case where a music-playing data set PD of a subject music piece include a plurality of instrument parts, a plurality of lesson steps may be provided for the plurality of instrument parts, respectively.

Each of the step information files or data sets SI is comprised of a music-playing data set PD for a lesson step or portion designating information files or data sets LI for designating at least a portion of a music-playing data set PD of a subject music piece (for example, start phrase designating information, end phrase designation information, and tempo designating information), and a lesson part designating information file or data set PI (such as right hand, left hand and both hands).

The portion designating information file or data set LI for designating at least a portion of a music-playing data file PD may not necessarily be limited to a start phrase designating information file and an end phase designating information file, but may be any form of information file for designating a range of music to be played back. For example, the information is to indicate an absolute time counted from the head of the music piece, or to indicate the number of measures counted from the head of the music piece. The data structure of the music-playing data set PD for a lesson step is of the same form as the music-playing data set PD of the subject music piece as shown in FIG. 2. The music-playing data set PD for a lesson step may be a music-playing data set which is made by omitting or modifying or simplifying some parts of the music-playing data set of the subject music piece, or a music-playing data set of a practicing music piece prepared for the practice of the subject music piece.

In the description herein-below, the "music-playing data set for a lesson step" means both of or either one of a music-playing data set PD for a lesson step itself and a portion designating information file or data set LI for designating at least a portion of a music-playing data set PD of a corresponding subject music piece.

FIG. 4 is a visualized chart depicting a pass/fail score table PT of the lesson steps about the respective songs (music pieces) according to an embodiment of the present invention. There is provided at least one pass/fail score table PT beforehand to record the pass/fail state of each lesson step of each subject music piece (song), with all the boxes of the table PT filled with "failed" as the initial setting. As the user takes a stepped lesson and pass a lesson step, the score of "passed" will be entered (overwritten) in the box of the practiced lesson step of the practiced subject music piece. The description into the box of the table may be not only "passed" or "failed," but also a point value or the number of times of practices. Further, the pass/fail score table PT may be additionally provided for each additional user of the music-playing practicing apparatus 1 to keep a plurality of pass/fail score tables PT's.

FIG. 5 is a plan view showing an example of the layout of the panel 100 of a music-playing practicing apparatus 1 according to an embodiment of the present invention. On the panel 100 is provided a display window 14 and several panel controls 12 (121-127) around the display window 14.

The panel controls 12 include at least mode setting controls for designating the music-playing and playback mode of the practicing apparatus 1, stepped lesson controls for designating details of the stepped lesson, and value setting controls for inputting various values.

As the mode setting controls, there are provided a stepped lesson switch 121, a song mode switch 122, a voice mode switch 123 and a style mode switch 124.

As the song mode switch 122 is operated and the practicing apparatus is turned to the song selection mode and then a song (a music-playing data set PD of a subject music piece) is selected by the ten-key switches 127, the manipulation of the stepped lesson switch 121 starts the stepped lesson of the selected subject music piece. The details of the stepped lesson will be described herein later. An intended lesson step can be manually designated by manipulating the stepped lesson mode switch 121 and then the ten-key switches 127.

The song mode switch 122 is a switch to turn into the mode in which the automatic music-playing data set PD is played back automatically, the voice mode switch 123 is a switch to turn into the mode in which a tone color is set and the user can play music by manipulating the music-playing device 22, and the style mode switch 124 is a switch to turn into the mode in which an automatic accompaniment, etc. will be added to the played music.

As the controls for the stepped lesson, there are also provided a stepped lesson mode selection switch 125 and a stepped lesson start/stop switch 126. The stepped lesson mode selection switch 125 is a switch to successively shift the modes of the stepped lesson: for example a listen-and-learn mode (LISTEN & LEARN), a timing mode (TIMING), a wait mode (WAIT), and an off mode (OFF). In the listen-and-learn mode, the user is to listen to the music of the music-playing data set for the stepped lesson automatically played back by the practicing apparatus without playing on the apparatus himself/herself. In the timing mode, the user is to play the practicing music piece according to the music-laying data set for the stepped lesson by manipulating the music-playing device 22 at the correct timing without paying particular attention to the notes (keys to depress). In the wait mode, the user is to play the practicing music piece according to the music-playing data set for the stepped lesson by manipulating the music-playing device 22 with the correct notes (keys to depress) without paying particular attention to the timing. In the off mode, the user is to play the practicing music piece according to the music-playing data set for the stepped lesson by manipulating the music-playing device with the correct notes (keys to depress) at the correct timing.

The ten-key switches 127 are value setting switches for inputting the song numbers, the lesson step numbers, etc. directly. There are also provided a minus key (−) and a plus key (+) for assisting in designating a song number or a lesson step number.

FIGS. 6a-6h are plan views each showing the content of the display screen 14 in the panel 100 of the practicing apparatus according to an embodiment of the present invention.

FIGS. 6a-6d show examples of displaying "pass" icons to indicate the pass/fail states of the corresponding lesson steps for the subject music piece.

In the present embodiment, when the user selects a music-playing data set PD of a subject music piece, the song number (ID number) of the selected subject music piece is displayed on the display screen 14, the title of the subject music piece is displayed to the right of the song number, and the "pass" icons are displayed below the title.

Where the user has passed all the lesson steps, without skipping the in-between steps, for the currently selected subject music piece (as identified by the song number and song title on the display screen 14), there are three star marks displayed on the display screen as shown in FIG. 6a. In the case where the user has passed lesson steps at the ending stage, but has not passed some steps in-between, as the case of "song 003" of the pass/fail table PT in FIG. 4, two star marks are displayed with a space in-between as shown in FIG. 6b. Further, in the case where the user has passed all the lesson steps, without skipping in-between steps except the last step or steps, as the case of "song 002" of the pass/fail table PT in FIG. 4, two star marks are displayed without a space in-between as shown in FIG. 6c. Further, other than the cases above, in the case where the user has passed one or more lesson steps, as the case of "song 001" of the pass/fail table PT in FIG. 4, one star mark is displayed as shown in FIG. 6d. Where the user has not passed any lesson step at all, no star mark is displayed. Although the illustrated embodiment employs star marks to indicate the "passed" state, the "pass" icons are not necessarily be limited to this mark. By displaying the progress state of the user in the way described above, the user can understand at a glance whether he/she has passed all the lesson steps of the stepped lesson for the selected subject music piece, or has passed the last lesson step or steps skipping some steps in-between, or has passed all the lesson steps except the last step or steps, or has passed one or more steps, or has passed no step at all.

FIG. 6e is a plan view showing an example of the display screen 14 which is displayed just after the transition to the stepped lesson mode or just after the designation of the lesson step. The display screen 14 indicates the lesson step of the stepped lesson for the currently selected subject music piece. The illustrated example shows that the "step 02" is selected for practicing. In the embodiment, the lesson parts (right hand, left hand, both hands) are predetermined for each lesson step and are not alterable by the user, but all the lesson parts may be previously provided for each lesson step for the user to select desired lesson parts for practicing.

Further in this embodiment, the lesson step which is displayed (i.e. selected automatically) just after the transition to the stepped lesson mode is the lesson step which is next to the highest of the lesson steps the user has passed. More specifically, where the stepped lesson is comprised of nine lesson steps 01-09, and the user has passed step 01, step 03 and step 05, when the stepped lesson mode switch 121 is manipulated, step 06 will be automatically selected. This will be convenient for the user, as the user can start practicing easily from the next step, when he/she once turns off the power to take a break or turns to another mode and then resumes the stepped lesson.

In another case, where the user has passed the lesson step of the highest level for the current subject music piece, the display 14 indicates (as selected) the lesson step of the lowest level among the lesson steps the user has not passed. More specifically, where there are nine lesson steps 01-09, and the user has passed step 01, step 03 and step 05 and step 09, when the stepped lesson mode switch 121 is manipulated, step 02 will be automatically selected.

If the stepped lesson mode switch 121 is manipulated in succession, every manipulation will designate a lesson step of a higher level successively for the current subject music piece. In other words, under the condition that some lesson step is being selected, if the stepped lesson mode switch 121 is manipulated, the next higher level step will be designated. This will facilitate the selection of a desired lesson step apart from the above-mentioned lesson step which is automatically selected.

FIG. 6f is a plan view showing an example of the display screen 14 which is displayed during the user is practicing with the stepped lesson. The kind of the mode of the stepped lesson which is currently running is displayed on the display screen 14. In the present embodiment, the stepped lesson provides the listen-and-learn mode, the timing mode, the wait mode and the off mode, as described above.

FIG. 6g is a plan view showing an example of the display screen 14 which is displayed just after the stepped lesson has been ended. When the playback of the user's manipulation in the lesson step (playback of the music-playing data set for the lesson step) is finished, the user's music-playing manipulations are evaluated, and the length of the bar indication will tell the result of the evaluation. In the illustrated example, the evaluated score will be presented in eight grades, with the number of solid squares indicating the result of the evaluation, the more the higher. For example, when one solid square is displayed, it means the score of 1-14 points, increasing the number according to the points, and the eight solid squares as shown in FIG. 6g means 90-100 points. The shape of the indication of the points is not necessarily be limited to a solid square.

FIG. 6h is a plan view showing an example of the display screen 14 which is displayed after the evaluation result of the lesson step is displayed as in FIG. 6g. The display screen 14 displays specific evaluation points. The illustrated example tells that the evaluation result is 58 points. Further, in the area to the right, a comment to the user is displayed scrolling horizontally. The comment will be "Try Again" as shown in FIG. 6h, when the evaluation result is less than the pass line (e.g. 60 points), or will be "Excellent!" when the evaluation result is equal to or greater than the pass line (e.g. 60 points) at the steps other than the last step, or will be "Congratulations" when the evaluation result is equal to or greater than the pass line (e.g. 60 points). The comments may not necessarily be limited to the above examples, and the pass line may be other than 60 points.

FIG. 7 is a flow chart showing the processing of the song mode in a practicing apparatus according to an embodiment of the present invention. As the power of the music-playing practicing apparatus is turned on, and then the user manipulates the song mode switch 122, the song mode processing starts at a step SA1.

A step SA2 is for the initial setting for the processing. For example, various flags, buffers, registers, etc. are initialized here.

A step SA3 detects whether there is a Manipulation for selecting a song (i.e. music-playing data set PD). When a selecting manipulation is detected, the processing goes along the YES arrow to a step SA4, and when a selecting manipulation is not detected, the processing goes along the NO arrow to a step SA7.

In the step SA4, the selected song is set replacing the old current song which has been previously set there. Thus, the song is set as the selected condition according to the user's selecting manipulation.

A step SA5 reads out the pass/fail state of each lesson step of the stepped lesson prepared for the current song as set in the step SA4, referring to the pass/fail score table PT of FIG. 4.

A step SA6 displays the song number and the song title of the current song as set in the step SA4 on the display screen 14, and displays the pass/fail indication as shown in FIG. 6a, 6b, 6c or 6d, based on the pass fail states read out in the step SA5.

A step SA7 sets a lesson mode according to the user's manipulation of the stepped lesson mode selection switch 125 replacing the old lesson mode which has been previously set there. There are provided four lesson modes: the listen-and-learn mode, the timing mode, the wait mode and the off mode as described above. One of the lesson modes is previously set as a default setting.

A step SA8 judges whether a manipulation for the transition to the stepped lesson mode is detected or not. When a manipulation for the transition to the stepped lesson mode is detected, the processing goes along the YES arrow to a step SA9 to conduct the processing for the stepped lesson (as will be described in detail herein later) before going forward to a step SA10. When a manipulation for the transition to the stepped lesson mode is not detected, the processing goes along the NO arrow to a step SA10. The detection of the manipulation for the transition to the stepped lesson mode is done by detecting whether the user manipulates the stepped lesson mode switch 121 or not.

A step SA10 conducts the processing for the other song modes. The other song modes include playback processing of the song which is set as a selected song at the step SA4, tone generating processing according to the user's music-playing manipulations, and so forth.

A step SA11 judges whether a manipulation for transition to any of other modes (including a voice mode, a style mode, etc.) has been detected. When a manipulation for the transition to another mode is detected, the processing goes along the YES arrow to a step SA12 to end the song mode processing, and the processing will proceed to processing of the mode corresponding to the transition detected at the step SA11. When a manipulation for the transition to another mode is not detected, the processing goes along the NO arrow back to the step SA3 to repeat the steps thereafter. Transition to another mode is detected by detecting a manipulation of the voice mode switch 123 or the style mode switch 124.

FIGS. 8a and 8b are, in combination, a subroutine flow chart showing the processing for the stepped lesson as conducted in the step SA9 in the song mode processing of FIG. 7.

The stepped lesson processing starts at a step SB1 (FIG. 8a). Then, a step SB2 judges whether the user has passed all the lesson steps of the stepped lesson for the selected song as set in the step SA4 of FIG. 7 without skipping steps in-between with reference to the pass/fail score table PT of FIG. 4. When the user has passed all the lesson steps, the processing goes along the YES arrow to a step SB3, and when there is one or more steps remaining "failed," the processing goes along the NO arrow to a step SB4.

The step SB3 sets the designation of the step information file or data set SI to be read out from the external storage device 15 to be executed (hereinafter, simply "step designation") to the lowest level step for the song. For example, where there are nine steps "001" through "009" provided, the step designation will be "step 001." Because of this processing, with respect to the song for which the user has finished all the lesson steps, the user can take the stepped lesson from the first lesson step. Then, the processing goes forward to a step SB7.

The step SB4 judges whether the user has passed the highest level (final) lesson step of the stepped lesson for the selected song as set in the step SA4 of FIG. 7 with reference to the pass/fail score table PT of FIG. 4. For example, where there are nine steps "001" through "009" provided, the step SB4 judges whether the user has passed the step "009." When the user has passed the highest level step, the process goes along the YES arrow to a step SB5, and when the user has not passed the highest level step yet, the process goes along the NO arrow to a step SB6.

The step SB5 sets the step designation to the lowest level lesson step among the lesson steps which the user has not passed with reference to the pass/fail score table PT of FIG. 4. For example, in the case where the song "001" is selected for the subject music piece in FIG. 4, the user has not passed the steps "002," "004," "006" through "009," which means the lowest level lesson step is the step "002," and the step SB5 sets the step designation to the step "002." Because of this processing, after the user has passed the highest level lesson step, the user is to start the stepped lesson automatically from the lowest level lesson step among the lesson steps which the user has not passed. Then, the process goes to a step SB7.

The step SB6 sets the step designation to the lesson step which is next to the highest level lesson step among the lesson steps which the user has passed with reference to the pass/fail score table PT of FIG. 4. For example, in the case where the song "001" is selected for the subject music piece in FIG. 4, the user has passed the steps "001," "003" and "005," which means the highest level lesson step is the step "005," and the step SB6 sets the step designation to the step "006" which is next to the step "005." Because of this processing, before the user passes the highest level lesson step, the user is to start the stepped lesson automatically from the lesson step which is next to the highest level lesson steps among the lesson steps which the user has passed. Then, the process goes to the step SB7.

With the present embodiment, the user can start the stepped lesson from the lesson step which is next to the highest level lesson step among the lesson steps which the user has passed. Alternatively, when the judgment at the step SB2 is negative (NO), the process flow may be designed to go to the step SB5, whether or not the user has passed the highest level lesson step, so that the user is to start the stepped lesson from the lowest level lesson step among the lesson steps which the user has not passed, where the user has not passed all the lesson steps.

The step SB7 sets various items as the preparation for playing music based on the music-playing data set for the stepped lesson and on the user's manipulations of the music-playing device 22. The items to be set in this step SB7 include, for example, the current position, the instrument parts (music-playing parts), the tone color, etc. in the music-playing data set based on the step information SI.

A step SB8 judges whether a manipulation of the song mode switch 122 (FIG. 5) by the user is detected. When the manipulation is detected, the process goes along the YES arrow to a step SB9, and when the manipulation is not detected, the process goes along the NO arrow to a step SB10.

The step SB9 selects a song according to the user's manipulation detected at the step SB8. The selection processing of a song at this step SB9 is almost the same as the processing at the steps SA4-SA6 in FIG. 7. The processing thereafter goes back to the step SB2.

The step SB10 judges whether a manipulation for the step change or the step selection by the user is detected. The detection of a manipulation for the step change/selection is conducted by the detection of the user's manipulations of the ten-key buttons 127 (FIG. 5) after the user's manipulation of the stepped lesson mode switch 121. When the manipulation is detected, the process goes along the YES arrow to a step SB11 to change the step designation to the selected step, before going back to the step SB7. When the manipulation is not detected, the process goes along the NO arrow to a step SB12.

The step SB12 judges whether a manipulation for the lesson mode change or the lesson mode selection by the user is detected. The detection of a manipulation for the lesson mode change/selection is conducted by the detection of the user's manipulation of the stepped lesson mode selection switch 125 (FIG. 5). When the manipulation is detected, the processing goes along the YES arrow to a step SB13 to change the lesson mode, before going back to the step SB7. When the manipulation is not detected, the processing goes along the NO arrow to a step SB14 (FIG. 8b).

The step SB14 judges whether a manipulation of the start/stop switch 126 for starting or stopping the stepped lesson by the user is detected. When a manipulation of the start/stop switch 126 is detected under the condition that the stepped lesson has not started (or the music-playing data set is not being played back), or when no manipulation of the start/stop switch 126 is detected under the condition that the stepped lesson has started, the processing goes along the CONTINUE arrow to a step SB15. When a manipulation of the start/stop switch 126 is detected under the condition that the stepped lesson has started (or the music-playing data set is being played back), the processing goes along the STOP arrow to a step SB22 to terminate the stepped lesson processing, before returning to the step SA9 of FIG. 7 to move forward to the step SA10.

The step SB15 advances the current position of the music-playing data set for the stepped lesson in accordance with the lesson mode as set in the step SA7 or in the step SB11, and reads out the event data piece, and compares and the read-out event data and the event data generated based on the user's music-playing manipulations on the music-playing device 22 to evaluate the user's music-playing manipulations, thereby progressing the lesson. In this processing in the step SB15, when the lesson mode is the listen-and-learn mode, or the timing mode, or the off mode, the current position is advanced based on the timing data in the music-playing data set, and when the lesson mode is the wait mode, the current position will be advanced waiting for an input of a music-playing manipulation event by the user. The comparison between the corresponding events and the evaluation of the user's manipulation are conducted by any of the known manners. For example, in the case of the "timing" mode, the timing of each input event of the user's music-playing manipulations is compared with the timing of the corresponding event in the music-playing data set, and the music-playing manipulation is evaluated according to the time difference between the two corresponding timing. In the case of the "wait" mode, the key name (note) of each manipulation event by the user is compared with the note name of the corresponding note in the music-playing data set, and music-playing manipulation is evaluated according to the note difference between the two corresponding notes. Further, in the case of the "off" mode, both the timing difference and the note difference are compared for evaluation.

A step SB16 judges whether or not the current position has reached the end of the music-playing data set for the stepped lesson. If the current position has reached the end, the processing goes along the YES arrow to a step SB17, and if not, the processing goes along the NO arrow back to the step SB8.

The step SB17 tallies evaluations of the respective events made by the step SB15 and displays the marked score on the display 14 of FIG. 1 as shown in FIGS. 6g and 6h.

A step SB18 judges whether the marked score as tallied in the step SB17 has reached the pass level of the lesson step. When the marked score has reached the pass level, the processing goes along the YES arrow to a step SB19, and when the marked score has not reached the pass level, the processing goes along the NO arrow back to the step SB7.

The step SB19 records a "passed" mark about the current designated lesson step in the pass/fail score table PT of FIG. 4.

A step SB20 judges whether the user has passed all the lesson steps of the stepped lesson for the currently designated song (subject music piece) without skipping any steps in-between with reference to the pass/fail score table PT of FIG. 4. When the user has passed all the lesson steps, the processing goes along the YES arrow to a step SB22 to terminate the processing for the stepped lesson, before returning to the step SA9 of FIG. 7 to move forward to the step SA10. If there is one or more lesson steps which the user has not passed, the processing goes along the NO arrow to a step SB21 and then back to the step SB4.

According to the present invention, therefore, when the user takes a stepped lesson the next time, the user can take a stepped lesson for a subject music piece starting at the lesson step which the user has not passed yet, as the practicing apparatus is provided with a plurality of lesson steps for each of a plurality of subject music pieces (songs) and records the pass/fail score table concerning the respective lesson steps. Further, when a subject music piece (song) is selected for practicing, the user can easily understand the past pass/fail states of the respective lesson steps for the selected subject music piece.

While several preferred embodiments have been described and illustrated in detail herein above with reference to the drawings, it should be understood that the illustrated embodiments are just for preferable examples, that the present invention is not necessarily be limited to the illustrated embodiments, and that the present invention can be practiced with various modifications, improvements and combinations without departing from the spirit of the present invention.

What is claimed is:

1. An apparatus for practicing playing music comprising:
 a storage device which stores a music-playing data set of a subject music piece to practice playing, a step information data set of a stepped lesson comprised of a series of lesson steps about the subject music piece, each step providing practicing materials for a user to master for playing the subject music piece, and a pass/fail data table for recording pass/fail judgments about achievements of the user with the practicing materials of the respective lesson steps;
 a step designating device for designating a lesson step to be given to the user step by step, with an in-between lesson step skippable, among the series of lesson steps;
 a stepped lesson conducting device which conducts the stepped lesson by giving the lesson steps about the subject music piece to the user according to the designation by the step designating device based on the step information data set of the stepped lesson;
 a music-playing input device for inputting music-playing manipulations by the user;
 a judging device which evaluates for each of the lesson steps given to the user, based on the step information data set of the stepped lesson, the inputted music-playing manipulations to judge whether the user has passed or failed in each of the lesson steps except a skipped in-between lesson step in terms of the practicing materials;
 a recording device which records for each of the lesson steps a result of the judgment by the judging device into the pass/fail data table, wherein the step designating device designates the lesson step to be given to the user with reference to the judgment result recorded in the pass/fail data table according to 1) where the user has passed all the lesson steps of the stepped lesson, the lesson step to be designated shall be a lesson step of a lowest level among the series of lesson steps, 2) where the user has not passed all the lesson steps of the stepped lesson but has passed a final lesson step, the lesson step to be designated shall be a lesson step of a lowest level among the lesson steps which the user has not passed yet, and 3) where the user has not passed all the lesson steps of the stepped lesson and has not passed the final lesson step as well, the lesson step to be designated shall be a lesson step which is next to a lesson step of a highest level among the lesson steps which the user has passed; and
 a display device which displays an identification of the subject music piece and the pass/fail judgments of the user about the lesson steps in the stepped lesson for the subject music piece.

2. An apparatus as claimed in claim 1, wherein the storage device stores data sets of a plurality of subject music pieces, and data sets of a plurality of stepped lessons each for practicing playing one of the subject music pieces, the apparatus further comprising:
 a selecting device for selecting a data set of a subject music piece from among the plurality of subject music pieces.

3. An apparatus as claimed in claim 1, wherein the display device indicates which of the lesson steps has been given and which of any of the lesson steps has been skipped.

4. A computer readable medium storing a computer program containing instructions executable by a computer for:
 reading out, from a storage device, a music-playing data set of a subject music piece, a step information data set of a stepped lesson comprised of a series of lesson steps about the subject music piece, each step providing practicing materials for a user to master for playing the subject music piece, and a pass/fail data table for recording pass/fail judgments about achievements of the user with the practicing materials of the respective lesson steps;
 designating a lesson step to be given to the user step by step, with an in-between lesson step skippable, among the series lesson steps;
 conducting the stepped lesson by giving the lesson steps about the subject music piece to the user according to the designation by the step of designating based on the step information of the stepped lesson;
 inputting music-playing manipulations by the user;
 evaluating for each of the lesson steps given to the user, based on the step information data set of the stepped lesson, the inputted music-playing manipulations to judge whether the user has passed or failed in each of the lesson steps except a skipped in-between lesson step in terms of the practicing materials;
 recording for each of the lesson steps a result of the judgment into the pass/fail data table, wherein the step of designating designates the lesson steps to be given to the user with reference to the judgment result recorded in the pass/fail data table according to 1) where the user has passed all the lesson steps of the stepped lesson, the lesson step to be designated shall be a lesson step of a lowest level among the series of lesson steps, 2) where the user has not passed all the lesson steps of the stepped lesson but has passed a final lesson step, the lesson step to be designated shall be a lesson step of a lowest level among the lesson steps which the user has not passed yet, and 3) where the user has not passed all the lesson steps of the stepped lesson and has not passed the final lesson step as well, the lesson step to be designated shall be a lesson step which is next to a lesson step of a highest level among the lesson steps which the user has passed; and
 displaying an identification of the subject music piece and the pass/fail judgments of the user about the lesson steps in the stepped lesson for the subject music piece.

5. An apparatus as claimed in claim 1, wherein the step information data set of a stepped lesson includes, for a lesson step, a second music-playing data set representing a practicing music piece for the lesson step.

6. An apparatus as claimed in claim 5, wherein the step information data set of a stepped lesson includes, for a lesson step, a portion designating data set for designating at least a portion of the music playing data set of the subject music piece to provide the second music-playing data set for the lesson step.

* * * * *